(12) United States Patent
Saad et al.

(10) Patent No.: US 11,212,491 B2
(45) Date of Patent: Dec. 28, 2021

(54) DATA MANAGEMENT OF CONNECTED CARS CAMERAS FOR HOMELAND SECURITY AND SMART CITIES

(71) Applicant: EMC IP Holding Company LLC, Hopkinton, MA (US)

(72) Inventors: Yossef Saad, Gannei Tikva (IL); Assaf Natanzon, Tel Aviv (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 72 days.

(21) Appl. No.: 16/024,295

(22) Filed: Jun. 29, 2018

(65) Prior Publication Data

US 2020/0007827 A1 Jan. 2, 2020

(51) Int. Cl.
*H04N 21/2187* (2011.01)
*H04N 7/18* (2006.01)
*G05D 1/00* (2006.01)

(52) U.S. Cl.
CPC .......... *H04N 7/188* (2013.01); *G05D 1/0038* (2013.01); *H04N 7/181* (2013.01); *H04N 21/2187* (2013.01)

(58) Field of Classification Search
CPC .... H04N 7/188; H04N 7/181; H04N 21/2187; G05D 1/0038

USPC ........................................................ 348/148
See application file for complete search history.

(56) References Cited

U.S. PATENT DOCUMENTS

| | | | |
|---|---|---|---|
| 7,619,508 B2 * | 11/2009 | Lynam | B60K 35/00 340/438 |
| 10,514,837 B1 * | 12/2019 | Li | G06F 3/0481 |
| 2007/0285512 A1 * | 12/2007 | Kitani | H04N 7/18 348/148 |
| 2014/0049636 A1 * | 2/2014 | O'Donnell | H04N 5/23206 348/143 |
| 2016/0042767 A1 * | 2/2016 | Araya | G11B 19/02 386/201 |
| 2016/0129883 A1 * | 5/2016 | Penilla | G06K 9/00771 348/148 |
| 2016/0214535 A1 * | 7/2016 | Penilla | G01C 21/3469 |
| 2017/0278368 A1 * | 9/2017 | Burke | G08B 13/19656 |
| 2018/0032829 A1 * | 2/2018 | Kim | G06Q 50/26 |
| 2018/0278897 A1 * | 9/2018 | Seaman | H04N 7/181 |

* cited by examiner

*Primary Examiner* — Jae N Noh
(74) *Attorney, Agent, or Firm* — Womble Bond Dickinson (US) LLP

(57) ABSTRACT

Disclosed is a method, apparatus, and system for collecting video data relating to a security event at a security operations center (SOC), the operations comprising: receiving video data captured through one or more cameras installed at one or more vehicles within a predetermined range of the security event at the SOC from the one or more vehicles; and compiling the video data into viewable format usable in an investigation of the security event.

18 Claims, 3 Drawing Sheets

100

DATA MANAGEMENT OF CONNECTED CARS CAMERAS FOR HOMELAND SECURITY AND SMART CITIES

FIELD OF THE INVENTION

Embodiments of the disclosure relate to data collection, and in particular, to collecting video data from connected vehicles located in the vicinity of a security event.

BACKGROUND

Connected cars are becoming the norm for new cars, and their Internet connectivity is used for many purposes, such as entertainment, security, communication, etc. In addition, there is a growing trend of using cameras in cars to assist drivers, and eventually to allow for autonomous driving.

When a security event (such as a major accident, a terrorist attack, or any other disaster) happens, it is important that the rescue and law enforcement forces be updated as soon as possible, and that they have the full information about what happened, including at the time prior to the event, so that they can respond appropriately.

Today, such information may be available only in places where the roads are covered with surveillance cameras. This may be common in major junctions and roads, but the coverage is far from being complete.

BRIEF DESCRIPTION OF THE DRAWINGS

Embodiments of the disclosure are illustrated by way of example and not limitation in the Figures of the accompanying drawings in which like references indicate similar elements.

DETAILED DESCRIPTION

Figure 1:
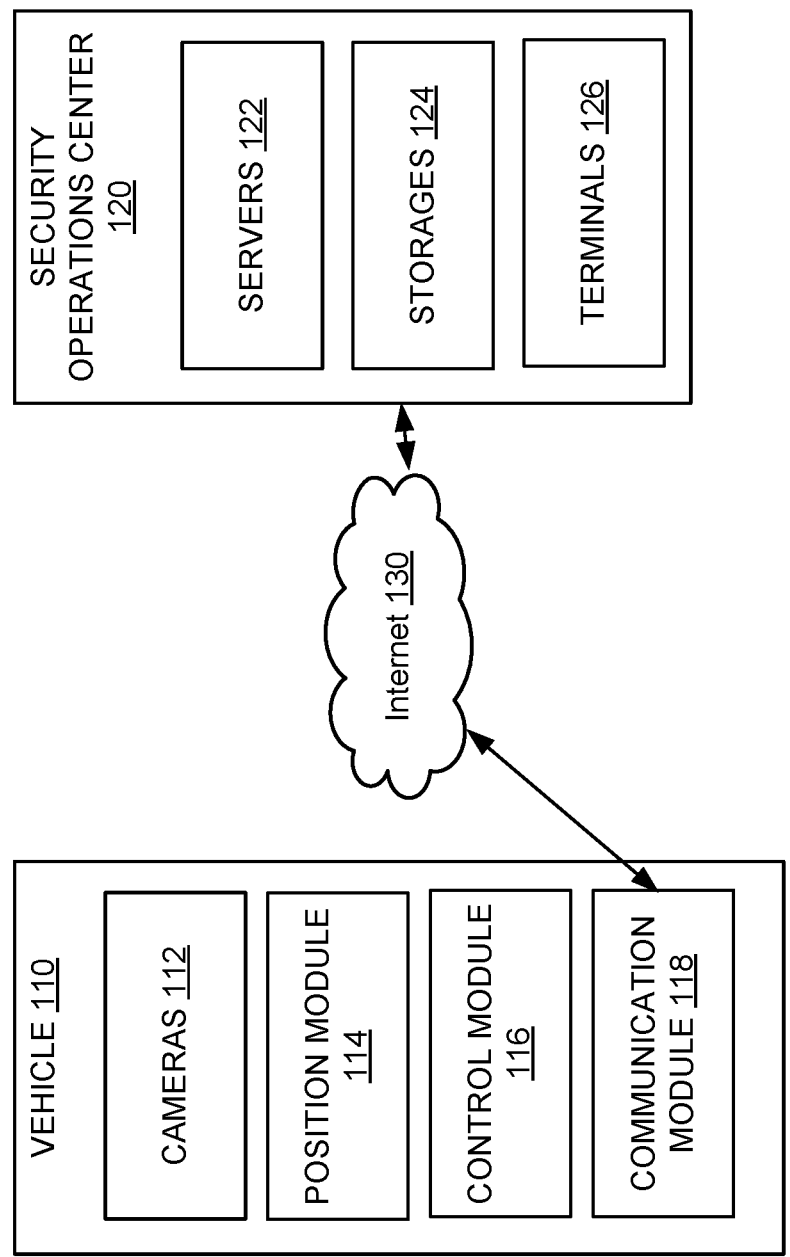
FIG. 1 is a block diagram illustrating an example environment in which embodiments of the disclosure may be practiced.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure are related to a method and system for leveraging the Internet connectivity and cameras on modern cars to assist governments and/or other organizations in the improvement of law enforcement or homeland security or delivery of smart city services. At a centralized operations center, video feeds may be retrieved from cameras deployed in connected cars that are at the vicinity of a certain security event (e.g., a terrorist attack). Based on the locations of the cars, the feeds from the appropriate cars may be sent to the central operations center and used for managing the situation. Some vehicle onboard systems also retain an archive of video footage (e.g., for resolution dispute in case of a car accident etc.), which can be useful in the investigation of what happened in the time prior to the trigger, e.g., before the actual security event happened.

The car industry has seen several major advances in the recent years. One trend is the increasing prevalence of connected cars. Most new models now have the option of being "connected", i.e., have an Internet connection (implemented in cellular, wireless local area network "WLAN," or other wireless connectivity technologies) that is used for entertainment, security and safety (On-Star), or information (navigation, Waze software), etc. This connection also enables control of various car functions, and is also an important part of the future of autonomous cars.

Furthermore, cameras are being installed in cars either for simplified maneuvering (e.g., rear-view camera or the "Park Assist" functionality), for recording the trip and avoiding fraudulent claims in case of an accident, for theft prevention, and recently also for safety purposes, such as Mobileye and similar devices. These cameras may continuously record the view in front of the car. In more advanced setups, 360-degree camera settings are also available (e.g., for "Park Assist").

Some cameras, combined with appropriate vehicle onboard systems, have several attributes to enable different functions. For example, the video footage for a certain period (e.g., X minutes) of the most recent past time may be kept, so that if an accident happens, it is possible to view the historical recording from the time of the accident and ascribe fault accordingly. As another example, various objects and situations on the road may be identified from the video feed to help alert the driver and prevent accidents.

In different embodiments, the car camera may be dedicated cameras deployed in the vehicles, or may be a camera in a mobile device (e.g., a smartphone) that is mounted in/on the vehicle (e.g., on a dashboard) combined with an appropriate application (e.g., "Drive Recorder" or "Autoguard Blackbox") running on the mobile device. The car cameras may be connected to the Internet (through Internet connectivity of a vehicle onboard system, or through Internet connectivity of a smartphone, or any other form of Internet connectivity) to upload their video feeds into a central location (or a cloud). The video feeds thus obtained may be used in the improvement of law enforcement or homeland security or delivery of smart city services.

Therefore, information and videos coming from multiple sources may be leveraged to derive at a Security operations center (SOC) one or more videos of the situation prior to and after a security event. Videos captured from cars in the vicinity of the event may be uploaded to the SOC (or a 3rd-party hosting facility), and combined into a viewable video stream. Cameras in the cars may transmit or upload their video feeds, whether real-time or recorded, through the Internet connection of the connected car (or through the Internet connection of a smartphone, as appropriate), to a server in the SOC (or in a 3rd party hosting facility), from where they can be viewed and analyzed. The transmission/ uploading of video feeds may be in response to a trigger (signal) from the SOC in case of an event, which may be sent through the Internet to the cars in the vicinity of the event (based on vehicle locations as determined by, e.g., a Global Navigation Satellite System "GNSS" such as the Global Positioning System "GPS"). In another embodiment, live video feeds may be continuously transmitted to the SOC during normal operations of the cars for continuous analysis and automatic event detection at the SOC.

Referring to FIG. 1, a block diagram illustrating an example environment 100 in which embodiments of the disclosure may be practiced is shown. A vehicle 110 may have installed thereon one or more cameras 112, a position module 114, a control module 116, and a communication module 118. These modules may be part of an onboard system of the vehicle 110. The position module 114 may comprise a GNSS module, and may be used to determine the location of the vehicle 110. The control module 116 may comprise such components as a processor and a memory, and may coordinate the operations of the various modules installed in the vehicle 110. The communication module 118 may comprise a cellular communication module, and/or a WLAN module, and/or other wireless communication module, and may enable the various modules of the vehicle 110 to access the Internet 130. The cameras 112, position module 114, control module 116, and communication module 118 may be connected via a suitable bus (not shown). It should be appreciated that although only one connected vehicle is illustrated in FIG. 1, the environment 100 may comprise any number of connected vehicles. In some embodiments, the cameras 112, position module 114, control module 116, and communication module 118 may be embodied in a mobile device, such as a smartphone, that is detachably mounted on a vehicle 110.

The environment 100 further comprises a security operations center (SOC) 120 that is connected to the Internet 130, which may comprise one or more servers 122 (e.g., media servers), one or more storages 124, and one or more terminals 126. Various kinds of the information may be gathered at the SOC 120 for automatic or human analysis, e.g., in the investigation of a security event. Through the Internet 130, bidirectional data communication channels may be established between the vehicle 110 and the SOC 120.

Figure 2:
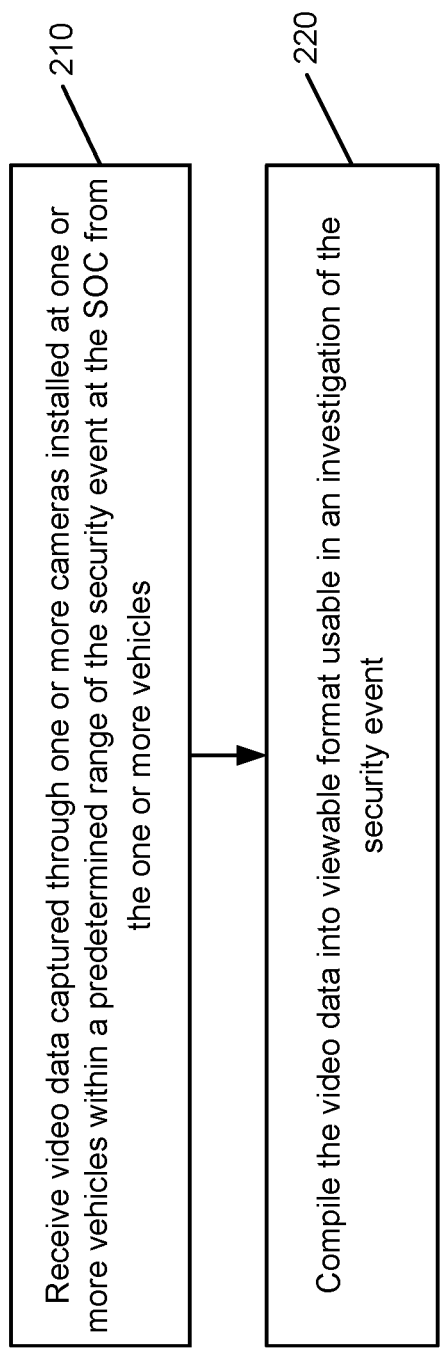
FIG. 2 is a flowchart illustrating an example method for collecting video data at a security operations center (SOC) relating to a security event, according to one embodiment of the invention.

Referring to FIG. 2, a flowchart illustrating an example method 200 for collecting video data relating to a security event at a security operations center (SOC), according to one embodiment of the invention, is shown. At block 210, video data captured through one or more cameras installed at one or more vehicles within a predetermined range of the security event may be received at the SOC from the one or more vehicles. At block 220, the video data may be compiled into viewable format usable in an investigation of the security event.

The cameras in the cars may capture video and the video data may be stored locally at the vehicles. In one embodiment, upon request, the video data may be transmitted to an SOC.

The vehicles (associated with user) may be registered in the server at the SOC and the car cameras may be included in the database. Incentives, such as a subsidy on the vehicle uplink connection, or a discount on the car insurance policy, etc., may be provided to the users to encourage registration. In one embodiment, the location of each registered vehicle may be continuously reported to the SOC. In another embodiment, the location of the registered vehicle may not be reported to the SOC during normal operations.

When a security event, such as a major accident or a terrorist attack, happens, the SOC may be notified (e.g., by citizens or police).

In the embodiment where locations of the registered vehicles are continuously reported to the SOC, the SOC may send a trigger message to all registered cars whose reported locations are within a predefined range of the event. In response to the trigger message, a vehicle may send the recorded video and/or the live video feed to a server at the SOC.

In the embodiment where registered vehicles do not continuously report their locations, the SOC may send a broadcast message comprising the location of the event (and in some embodiments, the required proximity to the event) to all registered vehicles. Each registered vehicle may calculate its distance to the event based on its own location, and if it is within the predetermined range, it will send its video to the SOC.

The video data transmitted to the SOC may comprise recorded video footages and/or live video feed. The media server at the SOC may then catalog and combine feeds from the various sources and present them to the users at the SOC on one or more terminals.

On one embodiment, a security event may be detected automatically based on video data. In particular, the cameras may continuously feed the live video to the SOC, where special deep-learning systems may analyze the video and detect abnormal behavior, and it could be presented to a human operator for further analysis to determine if there is indeed a security event. Alternatively, this analysis may be done at the camera/vehicle level through deep-learning implementation at the edge device (e.g., a vehicle onboard system, a mobile device, etc.).

Note that some or all of the components and operations as shown and described above (e.g., operations of method 200 illustrated in FIG. 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 3:
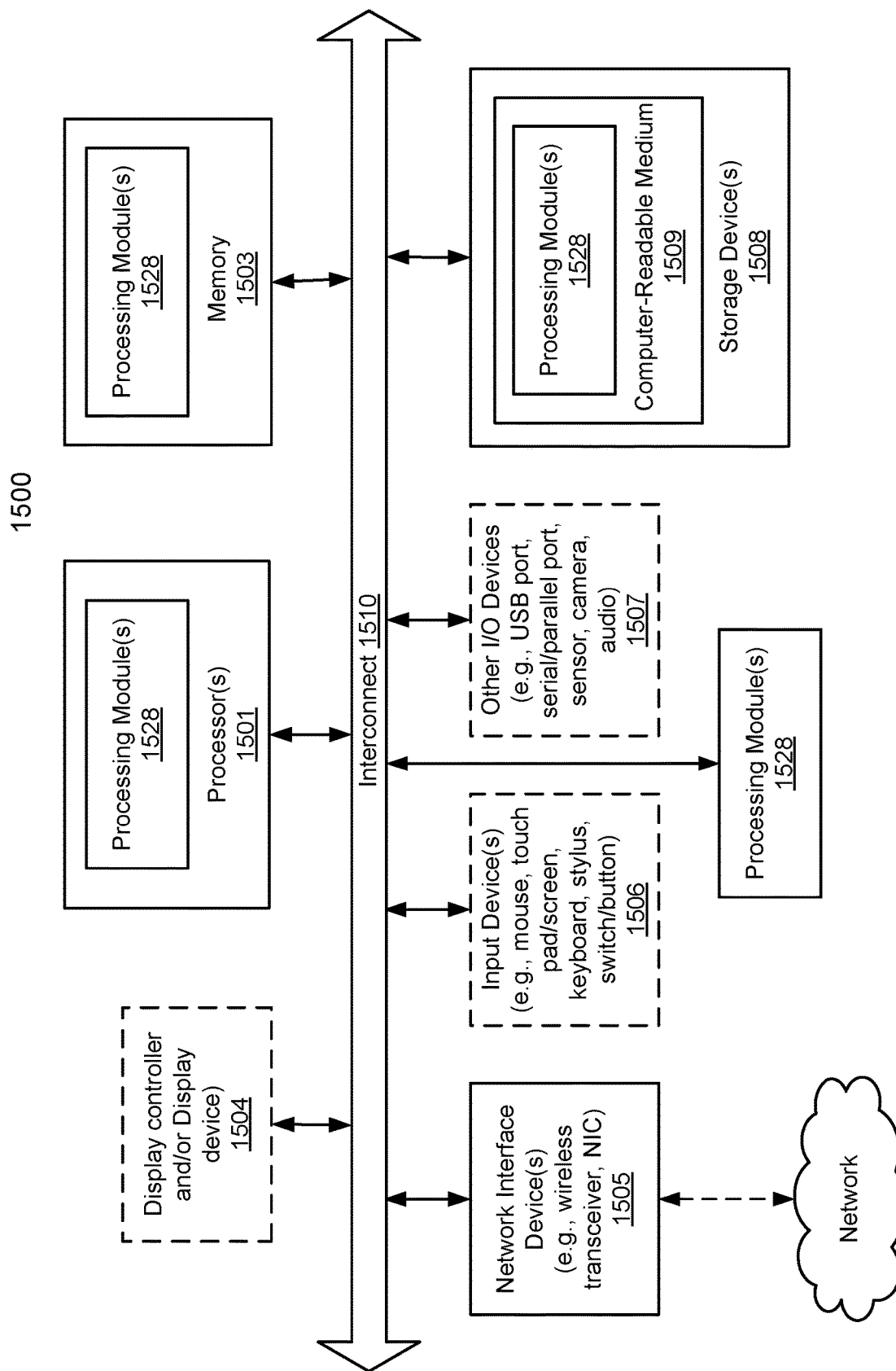
FIG. 3 is a block diagram illustrating an example of a data processing system which may be used with one embodiment of the invention.

FIG. 3 is a block diagram illustrating an example of a data processing system which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, backup history module 123, snapshot generation module 203, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding Figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for collecting video data relating to a security event at a security operations center (SOC), the method comprising:
    receiving video data captured through a plurality of cameras installed at a plurality of vehicles within a predetermined range of the security event at the SOC from the plurality of vehicles, wherein the security event comprises a traffic accident or a terrorist attack, and is detected automatically based on at least some of the video data, and wherein processing associated with the automatic detection of the security event is performed at least in part at some of the cameras or at some of the vehicles;
    compiling the video data into viewable format usable in an investigation of the security event; and,
    wherein the location of each registered vehicle is continuously reported to the SOC, and wherein a trigger message is transmitted subsequent to the security event from the SOC to a plurality of registered vehicles calculated to be within the predetermined range of the security event, and wherein in response to the trigger message, the plurality of vehicles transmit the video data to the SOC.

2. The method of claim 1, wherein a broadcast message comprising a location of the security event is transmitted subsequent to the security event from the SOC, and wherein the plurality of vehicles, in response to determining at the vehicles that they are within the predetermined range of the security event based on the broadcast message, transmit the video data to the SOC.

3. The method of claim 1, wherein at least some of the plurality of cameras are part of vehicle onboard systems.

4. The method of claim 1, wherein at least some of the plurality of cameras are comprised in mobile devices that are detachably mounted in vehicles.

5. The method of claim 1, wherein the video data comprise recorded video footages.

6. The method of claim 1, wherein the video data comprise a live video feed.

7. A non-transitory machine-readable medium having instructions stored therein, which when executed by a processor, cause the processor to perform operations for collecting video data relating to a security event at a security operations center (SOC), the operations comprising:
- receiving video data captured through a plurality of cameras installed at a plurality of vehicles within a predetermined range of the security event at the SOC from the plurality of vehicles, wherein the security event comprises a traffic accident or a terrorist attack, and is detected automatically based on at least some of the video data, and wherein processing associated with the automatic detection of the security event is performed at least in part at some of the cameras or at some of the vehicles;
- compiling the video data into viewable format usable in an investigation of the security event; and,
- wherein the location of each registered vehicle is continuously reported to the SOC, and wherein a trigger message is transmitted subsequent to the security event from the SOC to a plurality of registered vehicles calculated to be within the predetermined range of the security event, and wherein in response to the trigger message, the plurality of vehicles transmit the video data to the SOC.

8. The non-transitory machine-readable medium of claim 7, wherein a broadcast message comprising a location of the security event is transmitted subsequent to the security event from the SOC, and wherein the plurality of vehicles, in response to determining at the vehicles that they are within the predetermined range of the security event based on the broadcast message, transmit the video data to the SOC.

9. The non-transitory machine-readable medium of claim 7, wherein at least some of the plurality of cameras are part of vehicle onboard systems.

10. The non-transitory machine-readable medium of claim 7, wherein at least some of the plurality of cameras are comprised in mobile devices that are detachably mounted in vehicles.

11. The non-transitory machine-readable medium of claim 7, wherein the video data comprise recorded video footages.

12. The non-transitory machine-readable medium of claim 7, wherein the video data comprise a live video feed.

13. A data processing system, comprising:
- a processor; and
- a memory coupled to the processor to store instructions, which when executed by the processor, cause the processor to perform operations for collecting video data relating to a security event at a security operations center (SOC), the operations including:
  - receiving video data captured through a plurality of cameras installed at a plurality of vehicles within a predetermined range of the security event at the SOC from the plurality of vehicles, wherein the security event comprises a traffic accident or a terrorist attack, and is detected automatically based on at least some of the video data, and wherein processing associated with the automatic detection of the security event is performed at least in part at some of the cameras or at some of the vehicles;
  - compiling the video data into viewable format usable in an investigation of the security event; and,
  - wherein the location of each registered vehicle is continuously reported to the SOC, and wherein a trigger message is transmitted subsequent to the security event from the SOC to a plurality of registered vehicles calculated to be within the predetermined range of the security event, and wherein in response to the trigger message, the plurality of vehicles transmit the video data to the SOC.

14. The data processing system of claim 13, wherein a broadcast message comprising a location of the security event is transmitted subsequent to the security event from the SOC, and wherein the plurality of vehicles, in response to determining at the vehicles that they are within the predetermined range of the security event based on the broadcast message, transmit the video data to the SOC.

15. The data processing system of claim 13, wherein at least some of the plurality of cameras are part of vehicle onboard systems.

16. The data processing system of claim 13, wherein at least some of the plurality of cameras are comprised in mobile devices that are detachably mounted in vehicles.

17. The data processing system of claim 13, wherein the video data comprise recorded video footages.

18. The data processing system of claim 13, wherein the video data comprise a live video feed.

* * * * *